US006957159B2

(12) United States Patent
Kobayashi et al.

(10) Patent No.: US 6,957,159 B2
(45) Date of Patent: Oct. 18, 2005

(54) SYSTEM FOR ANALYZING COMPOUND STRUCTURE

(75) Inventors: Kinya Kobayashi, Tokyo (JP); Kiyomi Yoshinari, Tokyo (JP); Atsushi Otake, Tokyo (JP)

(73) Assignees: Hitachi Ltd., Tokyo (JP); Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 10/643,545

(22) Filed: Aug. 19, 2003

(65) Prior Publication Data

US 2004/0111228 A1 Jun. 10, 2004

(30) Foreign Application Priority Data

Dec. 9, 2002 (JP) ....................................... 2002-356120

(51) Int. Cl.[7] .......................... G06F 19/00; G01N 31/00
(52) U.S. Cl. ............................ 702/81; 250/292; 702/27
(58) Field of Search .............................. 702/23, 27, 81, 702/182; 250/282, 288, 292; 435/6, 91.2; 436/89

(56) References Cited

U.S. PATENT DOCUMENTS

| | | | | |
|---|---|---|---|---|
| 5,470,753 A | * | 11/1995 | Sepetov et al. | 436/89 |
| 5,538,897 A | | 7/1996 | Yates, III et al. | 436/89 |
| 6,656,690 B2 | * | 12/2003 | Crooke et al. | 435/6 |
| 6,745,134 B2 | * | 6/2004 | Kobayashi et al. | 702/27 |
| 6,765,200 B2 | * | 7/2004 | Maekawa et al. | 250/288 |

FOREIGN PATENT DOCUMENTS

| | | |
|---|---|---|
| EP | 0 898 297 | 2/1999 |
| JP | 08-124519 | 5/1996 |
| JP | 10-274640 | 10/1998 |
| WO | 02-097703 | 12/2002 |

OTHER PUBLICATIONS

Lahem, et al., "Observation of Thiohydroxy–Hydroxy–Carbene [HS–C–OH] When Searching for Thionformic Acid [HC( =S)OH] in the Gas Phase", May 16, 1997, Chemical Physics Letters 270, pp. 93–98.

Watkins, et al., "Mass Spectrometry Software for Biochemical Analysis in Electrospray and Fast Atom Bombardment Modes", 1991, Biochemical Society Transactions, Colchester, Essex, GB, vol. 19, pp. 957–962.

Fenyo, et al., "Protein Identification Using Mass Spectrometric Information", 1998, Electrophoresis, Weinheim, DE, vol. 19, pp. 998–1005.

Computer Program for De Novo Sequencing.

* cited by examiner

*Primary Examiner*—Bryan Bui
*Assistant Examiner*—John Le
(74) *Attorney, Agent, or Firm*—Hogan & Hartson, LLP

(57) ABSTRACT

An apparatus for analyzing mass spectrometric data is described. The apparatus has a first input section for entering first data of an ion measured by mass spectrometry, a second input section for entering second data of a dissociated ion of the ion measured by mass spectrometry, a first data storing section for storing third data of mass spectrometry of a plurality of candidates for the structure of ion, a calculation section for producing fourth data of mass spectrometry of dissociated ions to be used in analyzing the plurality of candidates and an evaluation section for evaluating the plurality of candidates by making comparisons between the first and third data and between the second and fourth data, so that the structure of ion can be identified.

20 Claims, 18 Drawing Sheets

DECOMPOSING REACTION OF RECERPINE

Lacto-N-DifucoHexaose

SYSTEM FOR ANALYZING COMPOUND STRUCTURE

FIELD OF THE INVENTION

The present invention relates to a system for analyzing compound structure, an apparatus and method for analyzing mass spectrometric data and a computer program for a computer used for the system.

BACKGROUND OF THE INVENTION

A mass spectrometer with tandem mass spectrometry, which dissociates a material (a parent ion) and analyzes dissociated ions, has been prevailing so as to improve the accuracy of identification of the material based on the data of mass spectrometry. Methods for identifying a parent ion and deriving the estimated structure thereof, which use mass spectrometric data, MS data for the parent ion and MS/MS data for a dissociated ion, are categorized as follows:

(1) Method for retrieving database of mass spectrometric data for a parent ion (MS data)

(2) Method for retrieving database of mass spectrometric data for a parent ion and a dissociated ion (MS data and MS/MS data)

(3) Method for employing measured mass spectrometric data for a parent ion and a dissociated ion (MS data and MS/MS data) but not utilizing database retrieval As an example of the conventional method (2), the Japanese Published Patent Application 8-124519 discloses a method for determining a candidate for parent ion. The method has the steps of: picking up candidates for an ion species, which have peaks correlating with those of mass spectrum of the ion species respectively, referring to a database of peaks; picking up candidates for a desorptive base which have desorptive masses correlating with those of the ion species, referring to a database of desorptive bases; and determining a candidate for a parent ion referring to a database which stores regulations applied to construction of the parent ion from dissociated ions and desorptive bases.

Also as an example of the conventional method (3), there is a computer program called "SeqMS" for supporting an analysis for amino acid sequence developed by Osaka University in Japan, which is reported in Lectures on Experiment in Post-Genome Era pages 137 to 139. The computer program is able to support in identifying amino acid sequences for a peptide without database retrieval, which includes about ten amino acid sequences. The method applied to the program, which employs statistical processing based on graph theory that takes into account a weighted value of dissociation probability empirically obtained from the mass spectrometric data of a peptide ion and dissociated ions thereof, provides candidates for the amino acid sequence.

Since data is not stored in a database for materials having unknown structure, it is difficult to identify a parent ion and derive estimated structure for a material having unknown structure if an analysis is performed with conventional methods (1) and (2) using database retrieval. These methods employ mass spectrometric data (MS data) for a parent ion and mass spectrometric data (MS/MS data, MS/MS/MS data) for a dissociated ion respectively in order to support the analysis.

Another method (3) described above, which employs statistical processing and information processing based on numerical matching, currently provides poor accuracy less than 50 percent in identifying a parent ion.

SUMMARY OF THE INVENTION

An object of the present invention is to provide a system, which enables highly accurate identification of a parent ion or estimation of the structure of parent ion and is applicable to materials having unknown structure.

Conventional systems require much participation of a user in estimating a parent ion when an analysis is conducted for measured data of $MS^N$ multiple dissociated ions. Therefore, another object of the present invention is to provide a system which is able to estimate the structure of a parent ion automatically from the $MS^N$ data.

An aspect of the present invention is to provide an apparatus for analyzing mass spectrometric data, which has a feature that the apparatus includes the following means. They are namely a first input means for entering first data of an ion measured by mass spectrometry, a second input means for entering second data of a dissociated ion of the ion measured by mass spectrometry, a first data storing means for storing third data of mass spectrometry of a plurality of candidates for the structure of ion, a calculation means for producing fourth data of mass spectrometry of dissociated ions to be used in analyzing the plurality of candidates and an evaluation means for evaluating the plurality of candidates by making comparisons between the first and third data and between the second and fourth data, so that the structure of ion can be identified.

Another aspect of the present invention is to provide an apparatus for analyzing mass spectrometric data, which has a feature that the apparatus includes the following means and data. They are namely an input means for entering one of first data measured by mass spectrometry for an ion and second data measured by mass spectrometry for a dissociated ion of the ion, first public data of mass spectrometry for candidates for the structure of ion accessible by internet and second public data of mass spectrometry for the structure of dissociated ion for each candidate accessible by internet. And the apparatus evaluates the candidates by making one of comparisons between the first data and first public data and between the second data and second public data, so that the structure of ion can be identified.

Still another aspect of the present invention is to provide a method for analyzing mass spectrometric data, which has a feature that the method includes the following steps. They are namely measuring first data of mass spectrometry for an ion to be analyzed, measuring second data of mass spectrometry for a dissociated ion of the ion, storing third data of mass spectrometry for a plurality of candidates for the structure of ion, calculating fourth data of mass spectrometry for dissociated ions to be used in analyzing the plurality of candidates for the structure of ion and estimating the structure of the ion by making comparisons between the first and third data, and between the second and fourth data.

Yet another aspect of the present inspection is to provide a computer program for a computer used for a system for analyzing compound structure, which has a feature that the computer program executes the following steps. They are namely measuring first data of mass spectrometry for an ion to be analyzed, measuring second data of mass spectrometry for a dissociated ion of the ion, storing third data of mass spectrometry for a plurality of candidates for the structure of ion, calculating fourth data of mass spectrometry for dissociated ions to be used in analyzing the plurality of candidates and estimating the structure of the ion by making comparisons between the first and third data, and between the second and fourth data.

A further aspect of the present invention is to provide a system for analyzing compound structure, which has a feature that the system includes the following means and apparatus. They are namely a means for conducting mass spectrometry for an ion to be analyzed and a dissociated ion of the ion and an apparatus for analyzing mass spectrometric data. The apparatus includes a first input means for entering first data measured by mass spectrometry for an ion to be analyzed, a second input means for entering second data measured by mass spectrometry for a dissociated ion of the ion, a data storing means for storing third data of mass spectrometry for a plurality of candidates for the structure of ion, a calculation means for producing fourth data of mass spectrometry for dissociated ions to be used in analyzing the plurality of candidates for the structure of ion and an evaluation means for evaluating the candidates by making comparisons between the first and third data, and between the second and fourth data, so that the structure of ion can be identified.

DESCRIPTION OF THE PREFERRED EMBODIMENTS

An embodiment of the present invention is now described referring to the accompanying drawings.

Figure 1:
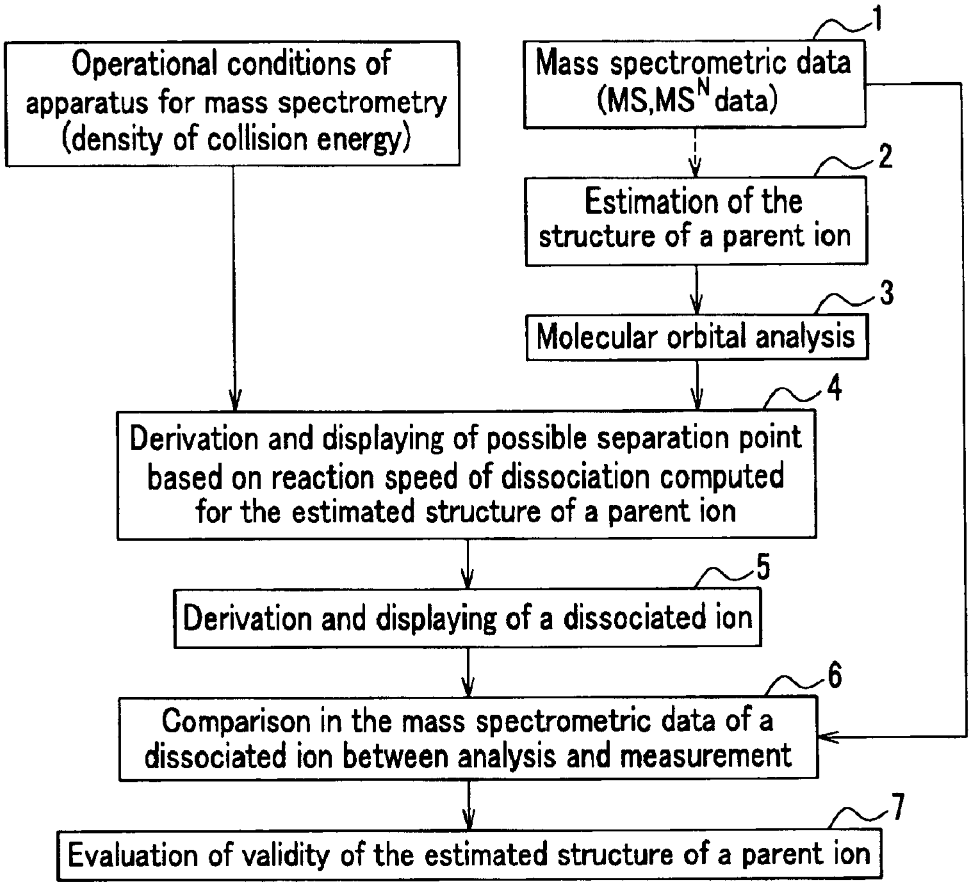
FIG. 1 is a flow chart showing a general flow for analysis of mass spectrometric data according to a first embodiment.
Figure 2:
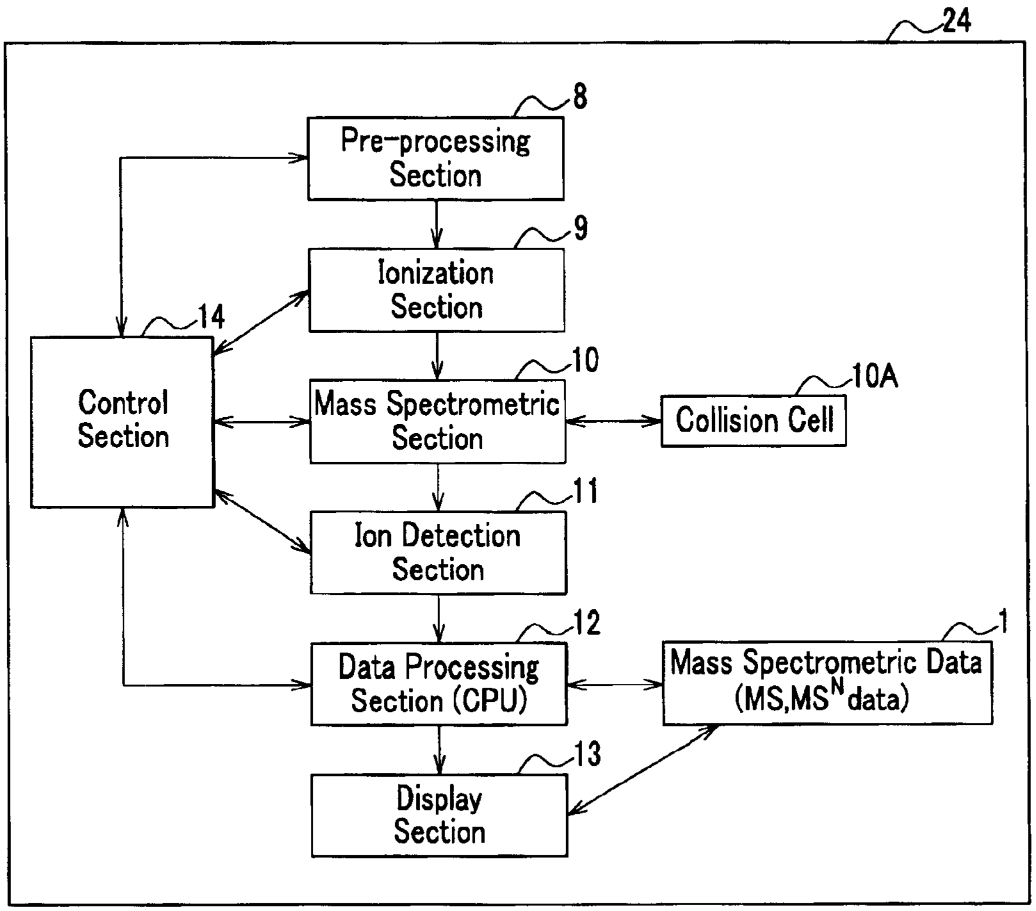
FIG. 2 is a general view showing an apparatus for analyzing mass spectrometric data according to a first embodiment.

A first embodiment of system for analyzing compound structure according to the present invention is described. FIG. 1 is a flow chart showing a general flow for analysis of mass spectrometric data according to the embodiment. Mass spectrometric data 1 is obtained by measurement with an apparatus 24 for mass spectrometry shown in FIG. 2. In the apparatus 24, a sample to be analyzed undergoes pre-processing by a pre-processing section 8 such as a liquid chromatograph and is ionized in an ionization section 9, being separated in a mass spectrometric section 10 according to the masses. The separated ion is detected by an ion detection section 11, the data of which is reduced and processed. Results of analysis, the mass spectrometric data 1, are displayed on a display section 13. A control section 14 controls a sequence of mass spectrometry, which ranges over ionization of a sample, transferring and entering the ion beam of sample in the mass spectrometry section 10, execution of mass spectrometry, detection of ion and processing of data.

Mass spectrometry is categorized into two methods generally. One is called MS method, which analyzes an ionized sample directly. The other method called tandem mass spectrometry or MS/MS analysis for short, which analyzes a dissociated ion produced by making a collision of a sample ion selected according to the mass with a buffer gas such as helium.

Figure 3:
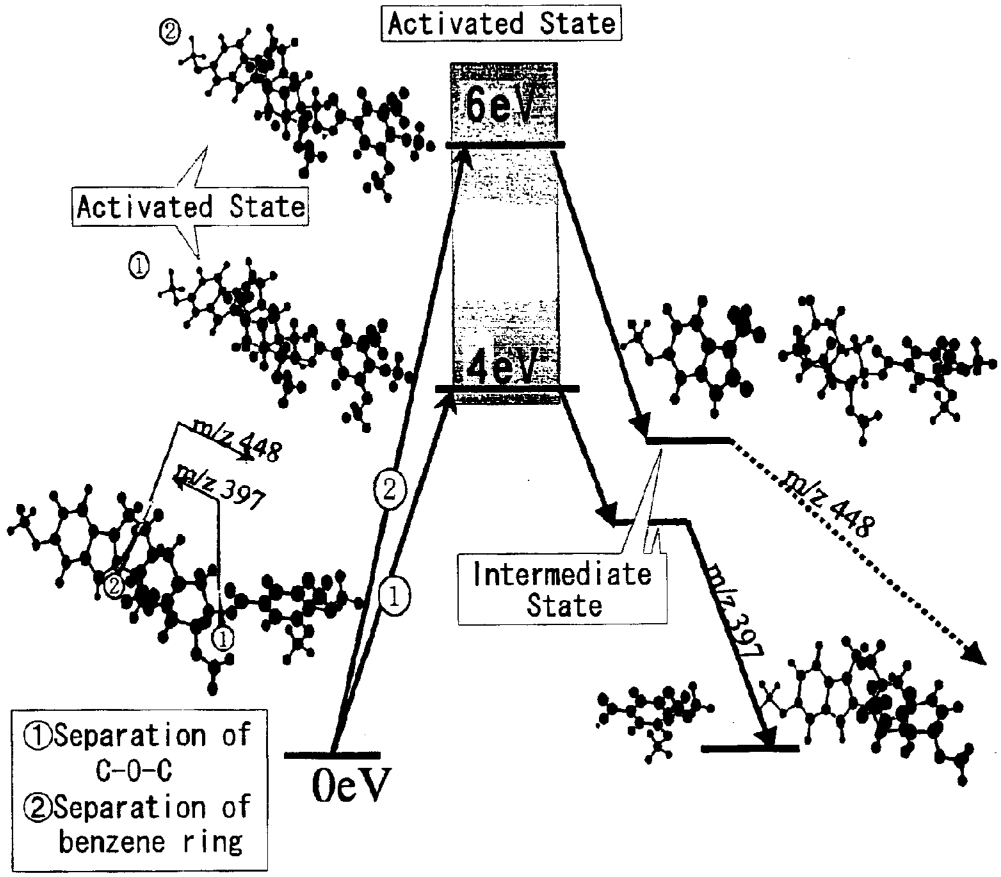
FIG. 3 is a conceptual diagram illustrating a method of displaying characteristics obtained by the molecular orbital analysis according to a first embodiment.

MS/MS analysis plays an important role in estimating the structure of parent ion, which analyses a dissociated ion produced from a specific sample ion (a parent ion) through collision induced dissociation so that the information on molecules forming the parent ion can be obtained. A collision cell 10A for collision induced dissociation may be provided separate from the mass spectrometry section 10. The collision energy generated by collision between an ion and a buffer gas such as a neutral gas can be calculated by Monte Carlo method based on the conditions and structure of an apparatus, a calculation for electric field and ion orbit and collision data. In the case of recerpine shown in FIG. 3, the collision energy between an ion and a buffer gas is estimated to be 1 eV. When a parent ion collides with a neutral gas such as helium and consequently dissociates, the parent ion transits to an activated state, which is followed by a stable state of dissociated ion, as shown in FIG. 3. A molecular orbital analysis at step 3 indicates that activation energy required for transition of a dissociated ion to an activated state differs from a dissociated ion species to another before the dissociated ion reaches a stable condition, in case of the recerpine shown in FIG. 3. It is assumed that a dissociated ion having smaller activation energy is more easily dissociated. In case of recerpine, the activation energy of a dissociated ion having a mass-to-charge ratio m/z of 397 amu is about 4 eV and that of a dissociated ion having m/z of 448 amu is about 6 eV. The reaction speeds of dissociation, which are proportional to exp (−4 eV/1 eV) and exp (−6 eV/1 eV) respectively, result in a speed ratio of 1 to 0.14.

Experimental measurement data of MS analysis for recerpine having m/z of 609 amu and MS/MS analysis for the dissociated ion supported the results obtained by the molecular orbital analysis at step 3. The experimental measurement data demonstrated that the intensity of spectrum signal of a dissociated ion having m/z of 397 amu was higher than that of the other dissociated ion having m/z of 448 amu, in other words the former was more easily dissociated than the latter. In this way, it is possible to perform accurate estimation for a dissociated ion by calculating activation energy at step 3 of molecular orbital analysis. It is assumed that a phenomenon of collision induced dissociation under such low energy conditions is thermal dissociation, namely thermochemical reaction.

Figure 4:
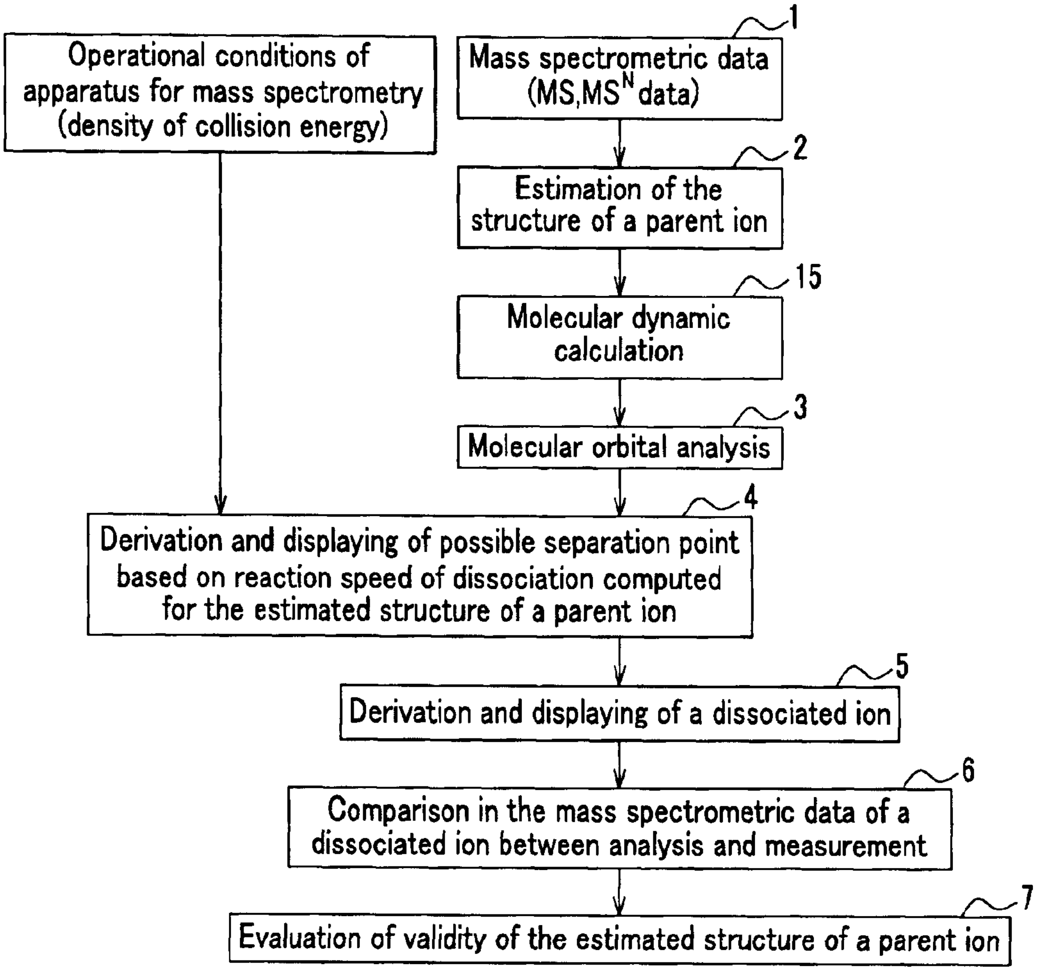
FIG. 4 is a flow chart showing a general flow for analysis of mass spectrometric data according to a second embodiment.
Figure 5:
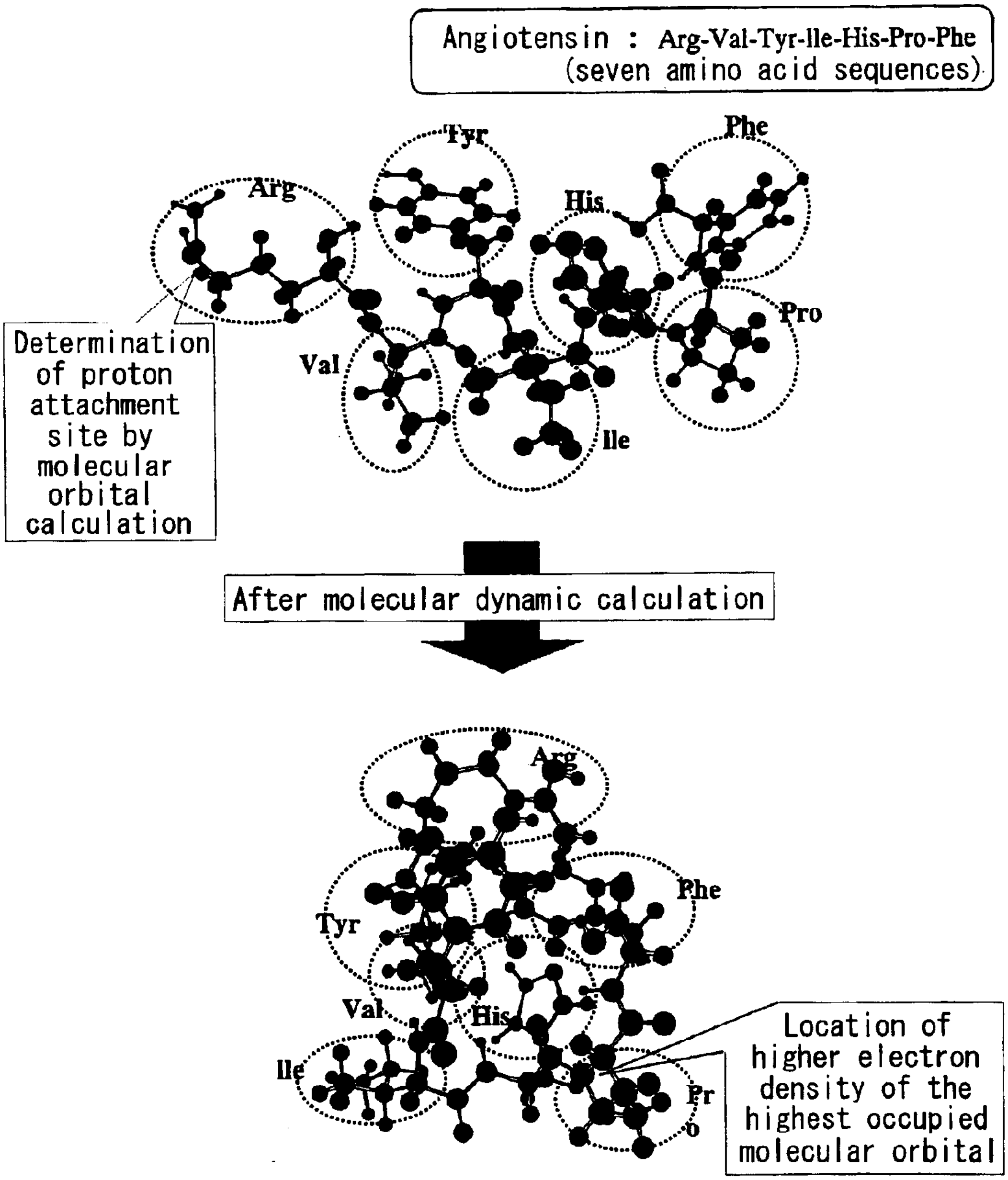
FIG. 5 is a diagram illustrating results of three-dimensional structural analysis as a result of executing molecular dynamic calculation for a peptide made of angiotensin.

A second embodiment of the present invention is described referring to FIGS. 4 and 5. The embodiment has a feature that a molecular dynamic calculation at step 15 is disposed before the molecular orbital analysis at step 3 in the flow shown in FIG. 4 so that the three-dimensional structure of a parent ion can be obtained before the calculation of thermal, chemical and energy characteristics for the parent ion executed by the molecular orbital analysis at step 3. FIG. 5 shows an example of peptide made of seven amino acid sequences called angiotensin. A proton attachment site is estimated by searching for the location having a higher electron density of the highest occupied molecular orbital (HOMO) obtained by molecular orbital calculation. As a result of estimation, it was known that a proton attached to a nitrogen atom of amino acid Arg.

In a case where a parent ion is a high polymer such as peptide, it is important to introduce three-dimensional structure taking into account the temperature while a dissociated ion is derived by the molecular orbital analysis at step 3. As shown in FIG. 5, the three-dimensional structure of angiotensin before molecular dynamic calculation extends sparsely. On the other hand, the structure, which has undergone molecular dynamic calculation taking into account the temperature of 300 K in an apparatus for mass spectrometry, changes remarkably into a centralized configuration. It therefore turns out to be important to derive the three-dimensional structure of a parent ion by molecular dynamic calculation at step 15 taking into account the temperature of apparatus before executing a calculation to obtain a dissociated ion by molecular orbital analysis at step 3. In this way, the present embodiment performs molecular dynamic calculation taking into account the temperature, thereby providing the accurate three-dimensional structure of a parent ion. When a parent ion is a high polymer, the present embodiment especially contributes to improvement of probability associated with estimation of a dissociated ion, which is derived based on the three-dimensional structure of parent ion.

Next, a molecular orbital calculation is executed for the structure stabilized by the molecular dynamic method. As a result of the calculation, it turns out that the location having a higher electron density of the highest occupied molecular orbital lies on a nitrogen atom, which is located in an amino acid Pro and closer to an amino acid His.

Since the reaction speed of dissociation is considered to take a large value at a location having a higher electron density of the highest occupied molecular orbital, it is known that a dissociated ion of the peptide ion is generated by dissociation between His and Pro, tending to form a type of Arg-Val-Tyr-Ile-His. Measurement by mass spectrometry showed that the peak of dissociated ion of Arg-Val-Tyr-Ile-His took the maximum value, demonstrating the validity of a method of structural analysis for peptide according to the present invention.

Figure 6:
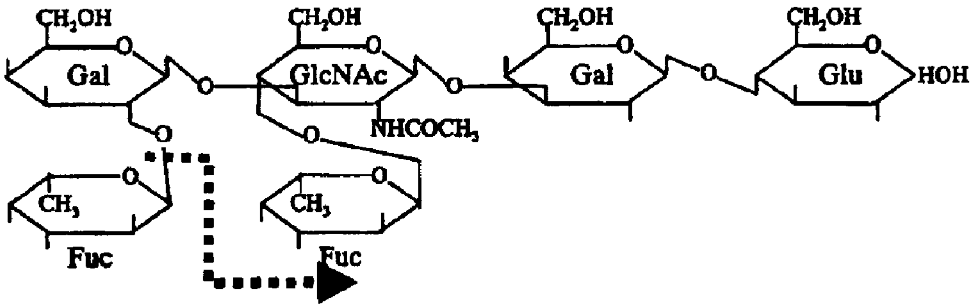
FIG. 6 is a diagram illustrating the molecular structure of Lacto-N-DifucoHexaose.
Figure 7:
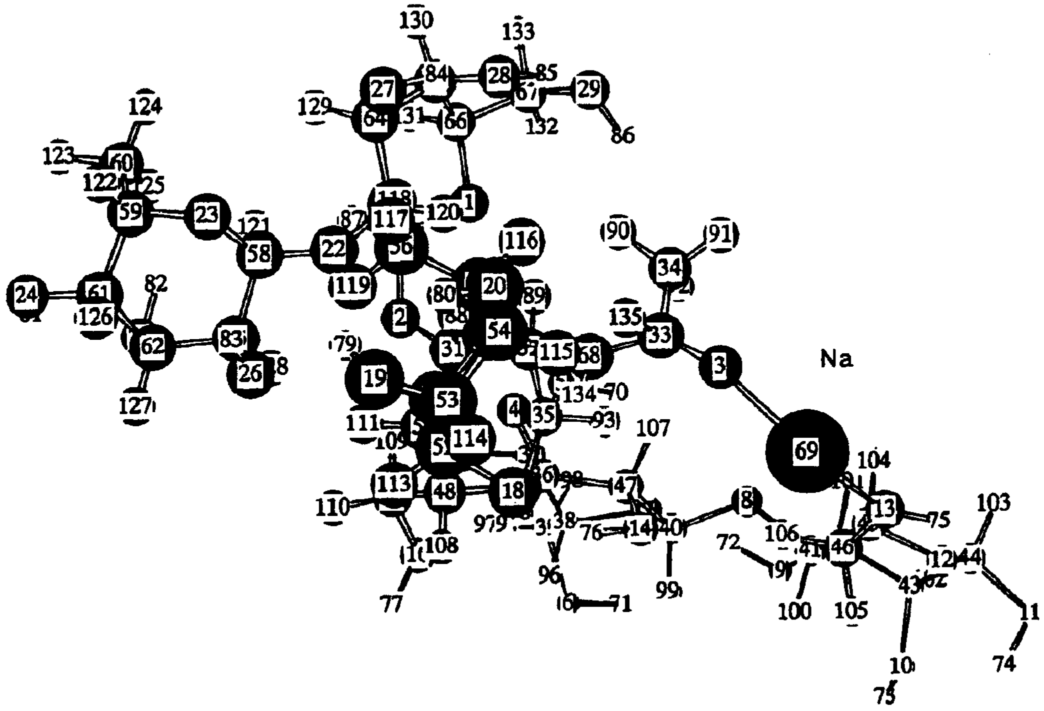
FIG. 7 is a diagram illustrating the result of three-dimensional analysis for a Lacto-N-DifucoHexaose ion.
Figure 8:
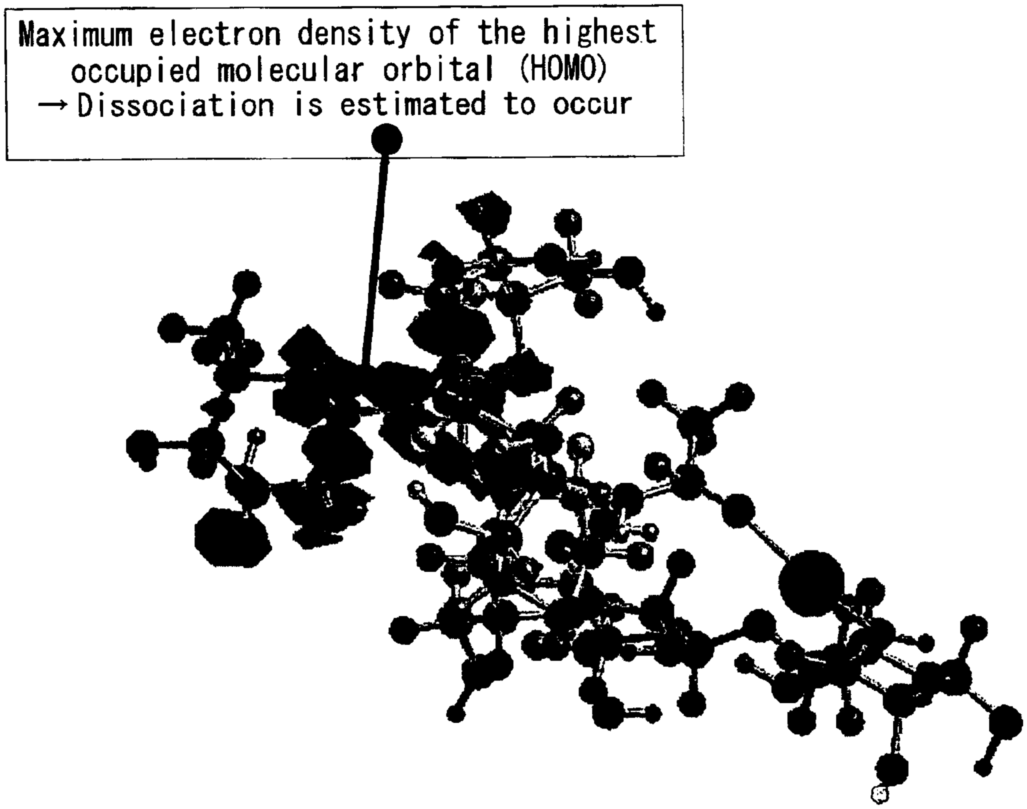
FIG. 8 is a diagram illustrating the result of molecular orbital calculation for a Lacto-N-DifucoHexaose ion.

A third embodiment of the present invention is described referring to FIGS. 6, 7 and 8. An example of sugar chain made of six kinds of sugar called Lacto-N-DifucoHexaose shown in FIG. 6 is described. The sugar chain is ionized by attachment of a Na ion. The structure of attachment of Na ion is displayed as shown in FIG. 7, which has the minimum total energy obtained by analysis of the sugar chain attached by a Na ion with molecular orbital and molecular dynamic calculation. Since an electron density of the highest occupied molecular orbital analyzed by molecular orbital calculation takes a higher value at the location shown in FIG. 8, it is estimated that the dissociation of sugar chain occurs at the location shown in FIGS. 6 and 8. Measurement by mass spectrometry showed that the estimated peak of dissociated ion took a maximum value, demonstrating the validity of the present method of three-dimensional and branch structure analysis for a sugar chain.

Figure 9:
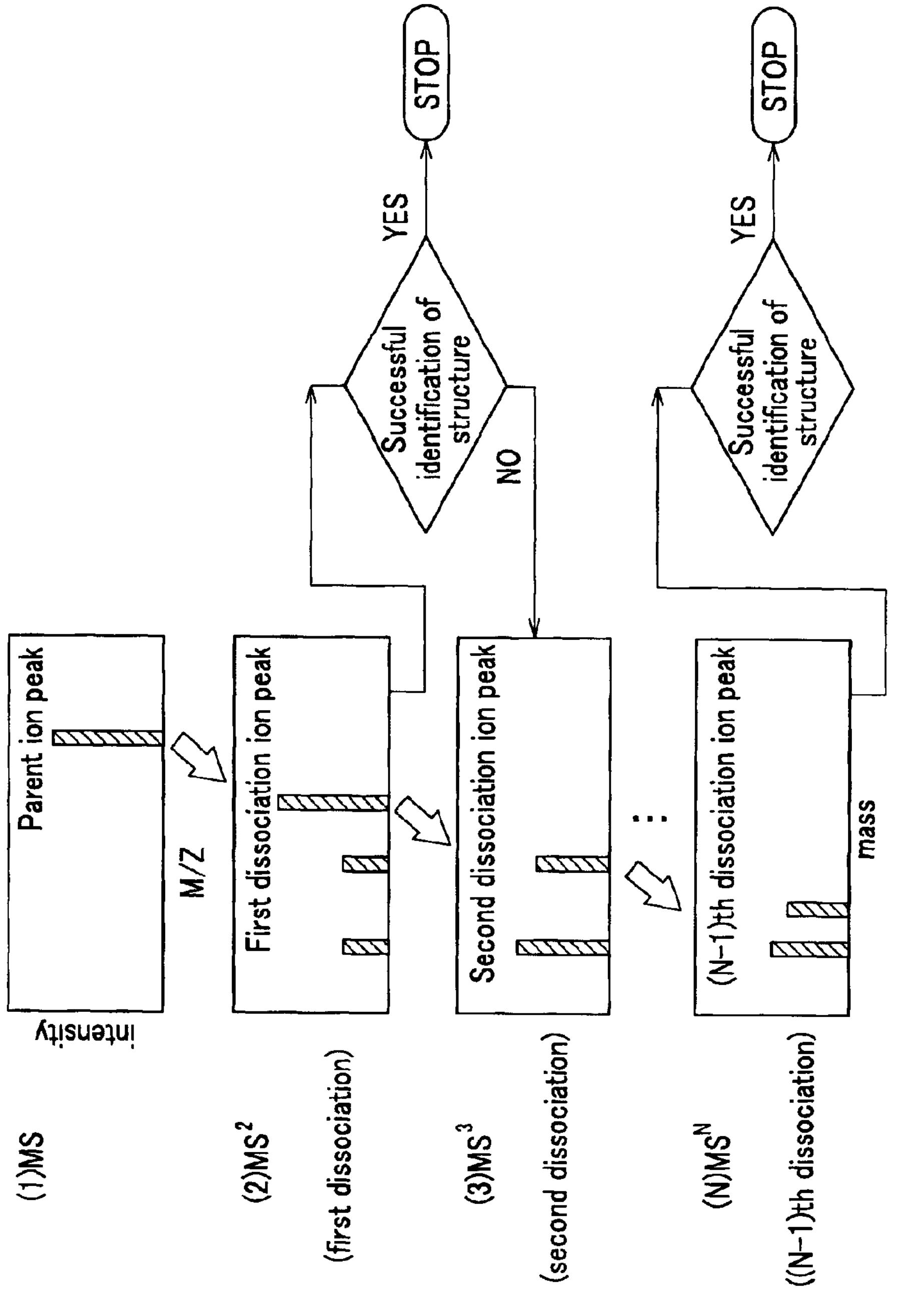
FIG. 9 is a flow chart showing a general flow for $MS^N$ analysis of mass spectrometric data according to a fourth embodiment.

A fourth embodiment of the present invention is described referring to FIG. 9. In case of an apparatus for mass spectrometry of ion trap type, the mass of a parent ion is measured at MS. At $MS^2$ (also referred to as MS/MS), the parent ion is dissociated and an evaluation can be performed for the pattern of dissociation of parent ion. Furthermore at $MS^3$, the dissociated ion generated at $MS^2$ is further dissociated by collision with a buffer gas. Steps are continued in the same way so that a dissociated ion generated at $MS^{N-1}$ is further dissociated by collision with a buffer gas at the subsequent $MS^N$.

A flow of estimating the structure of an ion is described below. At a step of MS/MS, a molecular orbital analysis is performed for candidates for ion structure, which are obtained by numerical matching/data base retrieval, and thereby the pattern of dissociation of a parent ion is evaluated. If the structure of parent ion can be determined at this step, the flow completes. If not, an ion is selected from the dissociated ions generated at the step of MS/MS and dissociated. If the structure of parent ion can be determined, the flow completes. If not, the ion is further dissociated. If the structure can be determined successfully, further dissociation is made to stop automatically, thereby obviating unnecessary steps of dissociation and relieving the task of a user. The present embodiment provides a method to estimate a dissociated ion of a parent ion by molecular orbital analysis, thereby enabling accurate estimation of the structure of parent ion in a case where the data associated with the dissociated ion of candidates for the parent ion is not stored in a database. It is also possible to estimate the structure of a parent ion more accurately by introducing the repetition of such steps as executing mass spectrometry for a dissociated ion and comparing the obtained data with a database or results of estimation performed by molecular orbital analysis.

Figure 10:
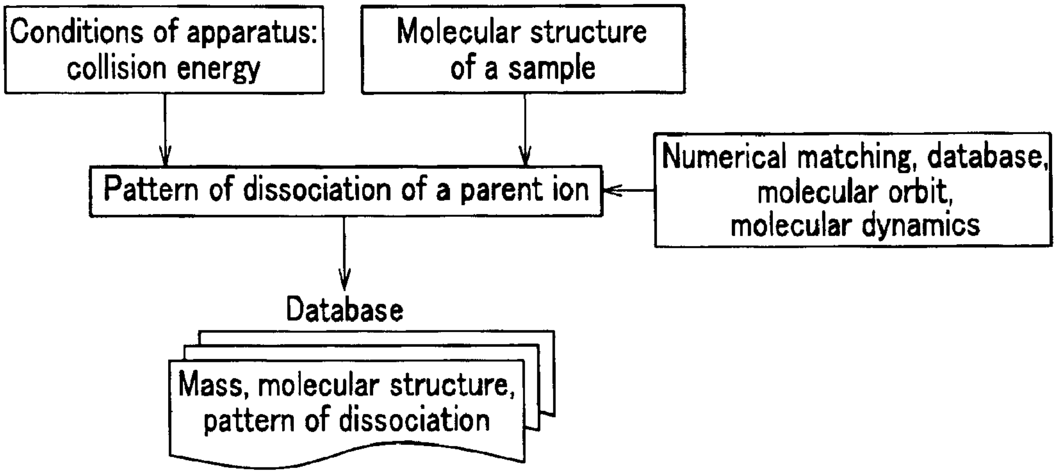
FIG. 10 is a flow chart showing a general flow for analysis of mass spectrometric data according to a fifth embodiment.

A fifth embodiment of the present invention is described referring to FIG. 10. In this embodiment, patterns of dissociation obtained by molecular orbital analysis are stored in a database in advance for the structure of parent ions having predetermined mass, in addition to the conditions of operation of an apparatus for mass spectrometry, numerical matching and database retrieval. The structure of a parent ion is determined based on the database. The present embodiment, which utilizes the database storing results of the previous calculations at estimation of the structure of a parent ion, makes it unnecessary to perform the same calculation, thereby reducing time required for estimation of the structure.

Figure 11:
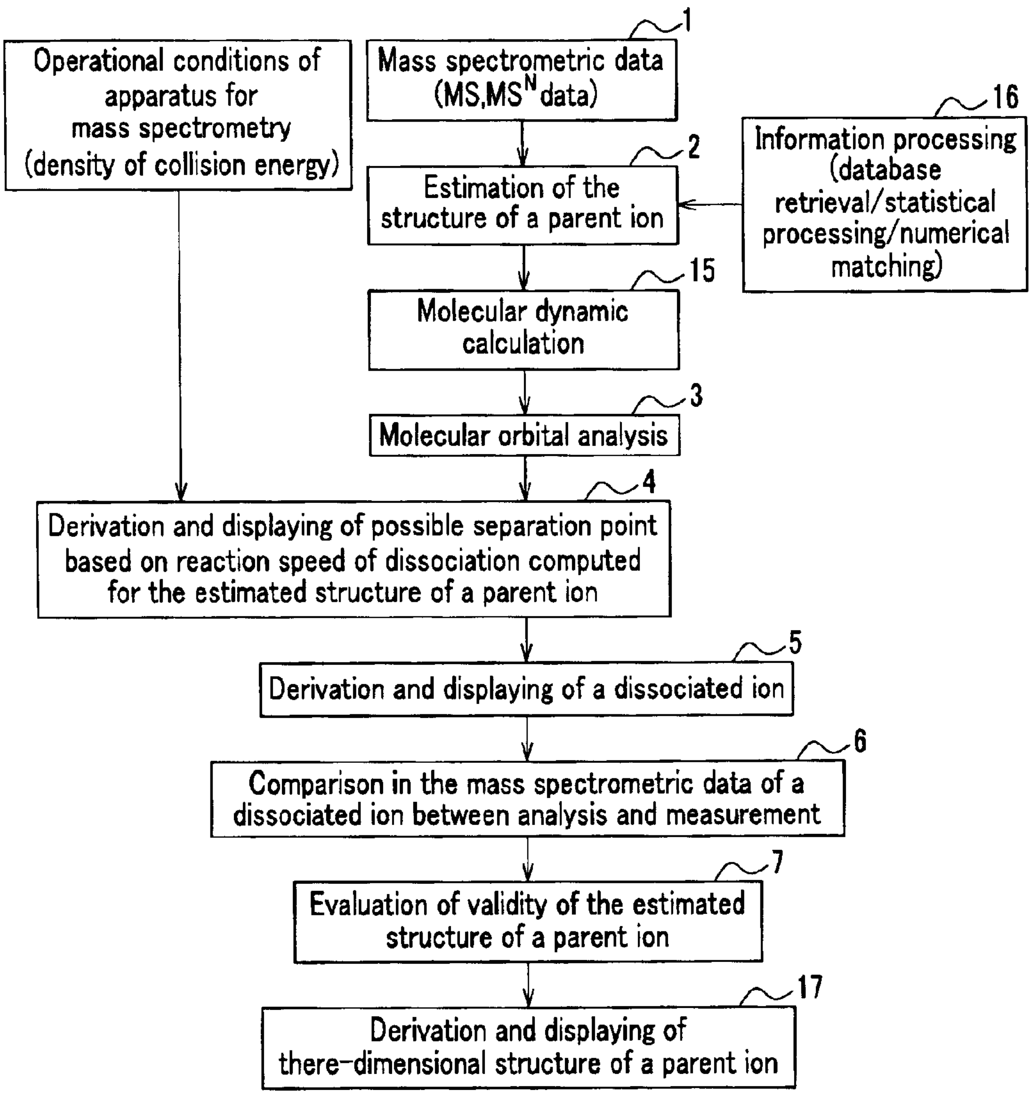
FIG. 11 is a flow chart showing a general flow for analysis of mass spectrometric data according to a sixth embodiment.
Figure 12:
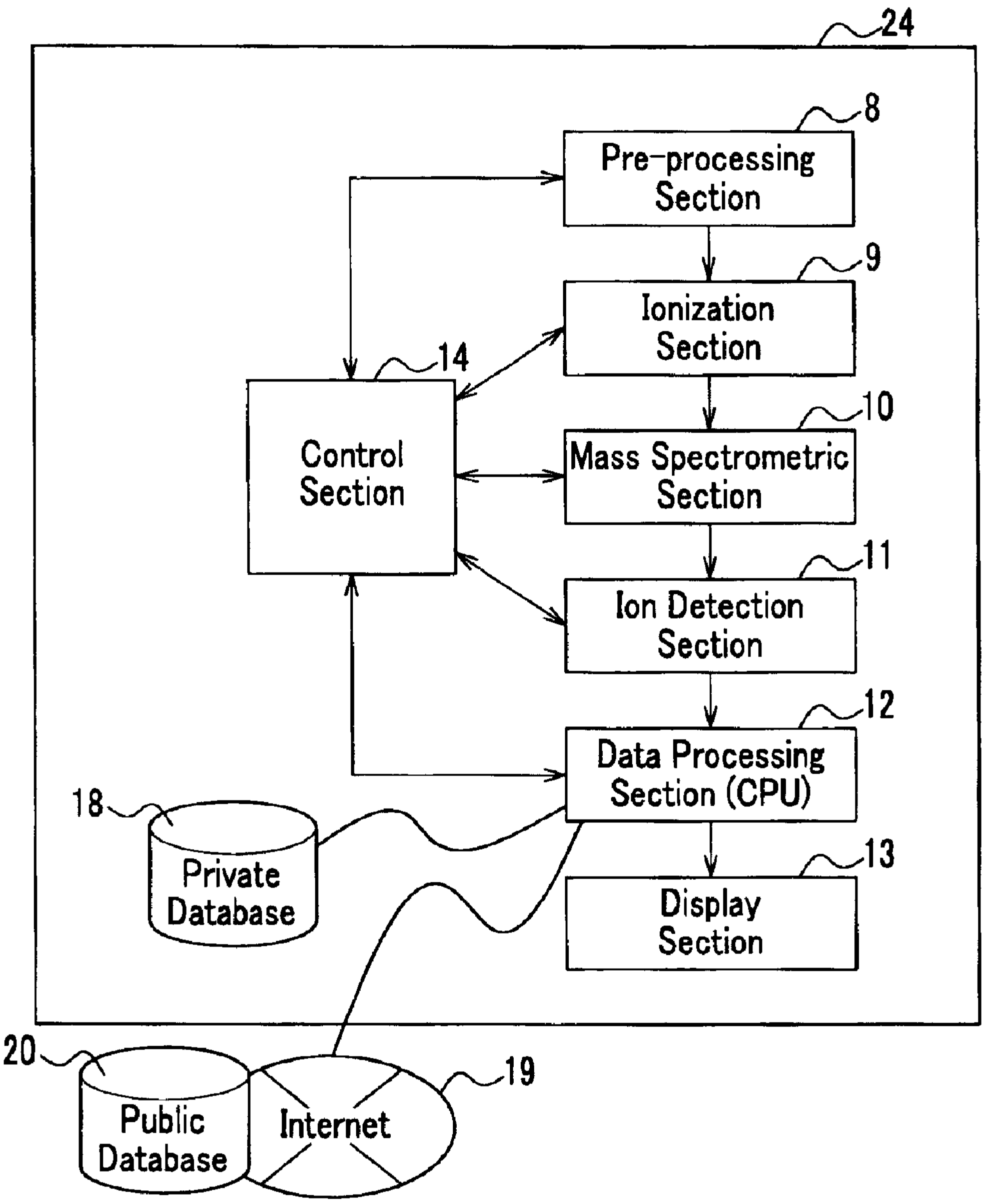
FIG. 12 is a diagram showing a general view of an apparatus for analyzing mass spectrometric data according to a sixth embodiment.
Figure 13:
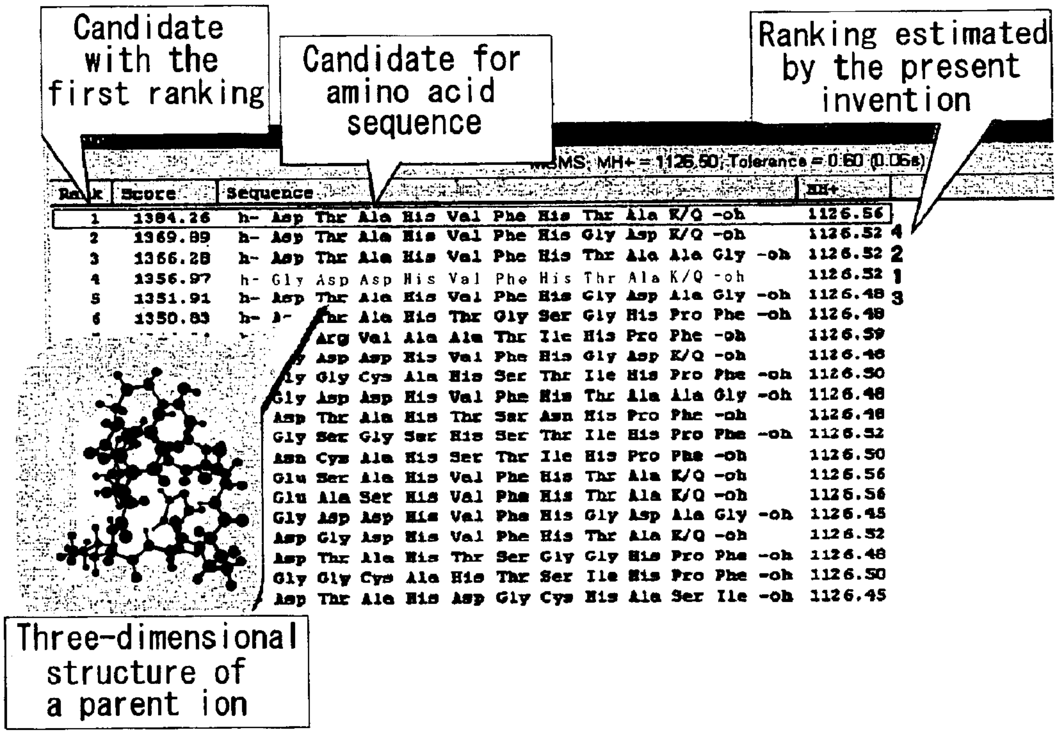
FIG. 13 is a diagram illustrating an example of displaying according to a sixth embodiment.

A sixth embodiment of the present invention is described referring to FIGS. 11, 12 and 13. As shown in FIG. 11, information processing at step 16, such as database retrieval, statistical processing and numerical matching, can provide estimation of the structure of a parent ion at step 2, in a method for analyzing mass spectrometric data, with single or plural candidates. An apparatus for mass spectrometry according to the present embodiment is shown in FIG. 12. The apparatus includes a private database 18, a public database 20 on an internet 19, which contain such data as mass-to-charge ratios of parent ions or dissociated ions thereof and ion intensities of dissociated ions. As an alternative, candidates for the structure of a parent ion listed up in a data processing section 12 based on mass spectrometric data 1 by retrieving the private database 18 or public database 20 may be conveyed to molecular orbital analysis at step 3 shown in FIG. 11. A list of amino acid sequences resulted from an analysis with a conventional method is shown in FIG. 13, for example, in which many candidates for parent ion are listed up. A reliability score for each candidate is usually provided on the list, which has been derived empirically. If a parent ion is excluded from the empirical estimation, a user is required to select the most probable one from the candidates based on technical knowledge of his own. On the other hand, the present embodiment is able to perform molecular orbital analysis at step 3 for all candidates for a parent ion or some candidates having higher scores, thereby deriving a dissociated ion at step 5 shown in FIG. 11. In this way it is possible to inspect consistency between the calculated data and measured data of dissociated ion by spectrometry or similarity between them and thereby the present embodiment allows an accurate evaluation of the structure of a parent ion. In other words, it is possible to put new ranking, which is determined as a result of molecular orbital analysis, on candidates for a parent ion. Therefore, the present embodiment enables further accurate estimation of the structure of a parent ion and is able to provide ranking of reliability for the candidates in terms of molecular orbital analysis. Also the present embodiment makes it feasible to estimate the structure of a parent ion accurately by introducing the public database 20 on an internet if a user does not have a large scale database. A step 17 for displaying three-dimensional structure can be added, which displays three-dimensional structure for the candidates of higher ranking, as shown in FIG. 13. This provides a user with a chance to understand visually the results of three-dimensional structure analysis, which is helpful when he inspects the three-dimensional structure of a synthetic material and the like. It is especially true of drugs, in which the three-dimensional structure plays a very important role in its development. The present embodiment enables displaying of the three-dimensional structure of a drug based on the results of mass spectrometry at low cost and high speed, thereby contributing greatly to efficient development of a drug.

Figure 14:
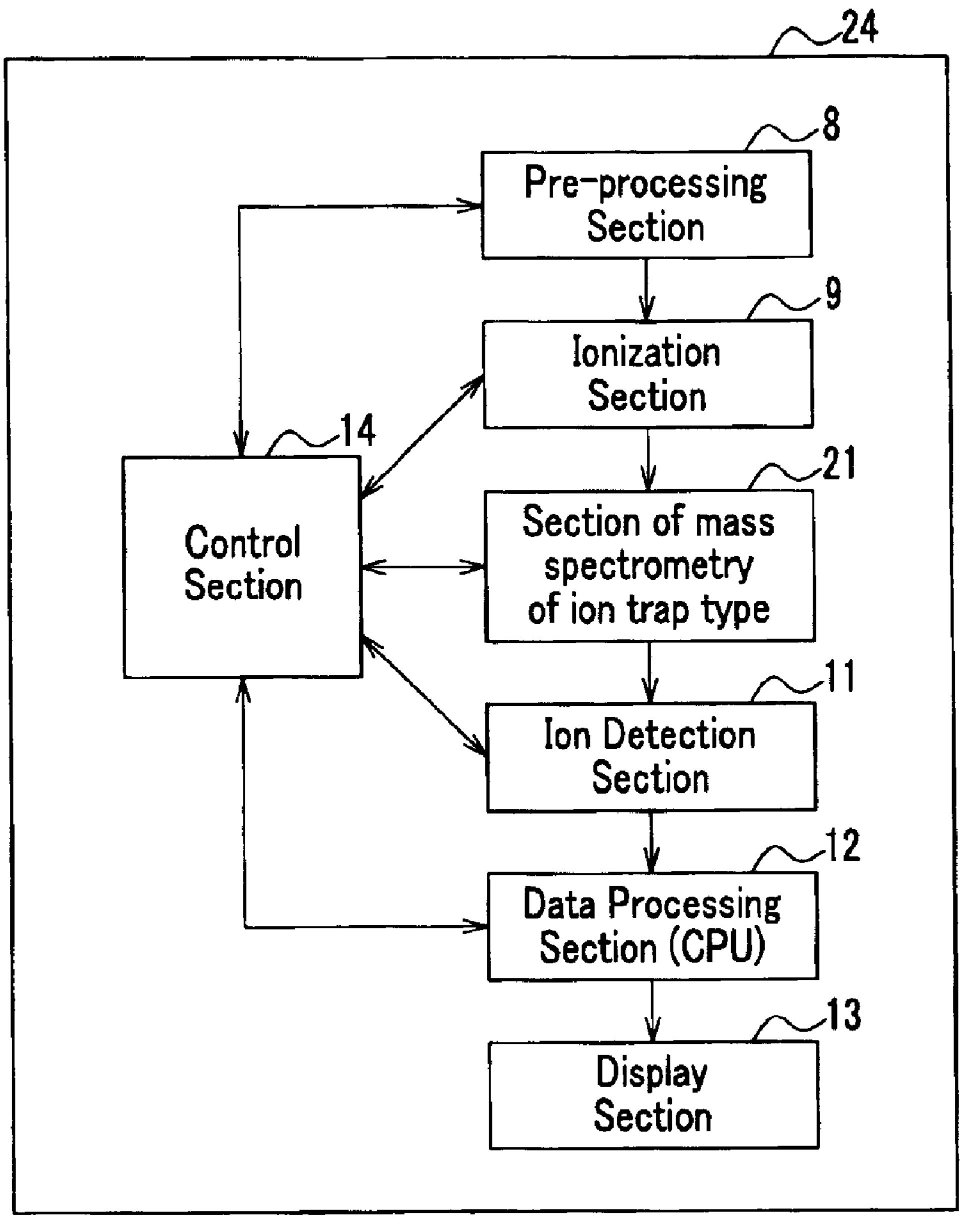
FIG. 14 is a diagram showing a general view of an apparatus for analyzing mass spectrometric data according to a seventh embodiment.

A seventh embodiment of the present invention is described referring to FIG. 14. The embodiment has a feature that an apparatus 24 for mass spectrometry, to which a method for analyzing mass spectrometric data is applied, has a section 21 of mass spectrometry of ion trap type. The section 21 can serve as both a section 10 of mass spectrometry and a collision cell 10A shown in FIG. 2. In the section 21, mass spectrometric data 1 is obtained in the following manner. Only parent ions which have been selected undergoing a process of mass selection are trapped in the section 21. These parent ions repeat collisions with a neutral gas filled in the section 21 and are dissociated, in which an electrical field of collision induced dissociation (CID) that has a resonant frequency of parent ion is superimposed on an ion trap electric field. Dissociated ions are separated according to the masses in the section 21 and thereby the mass spectrometric data 1 for the parent ions and dissociated ions is obtained. In this way, the present embodiment employing the section 21 allows downsizing of an apparatus for mass spectrometry.

Figure 15:
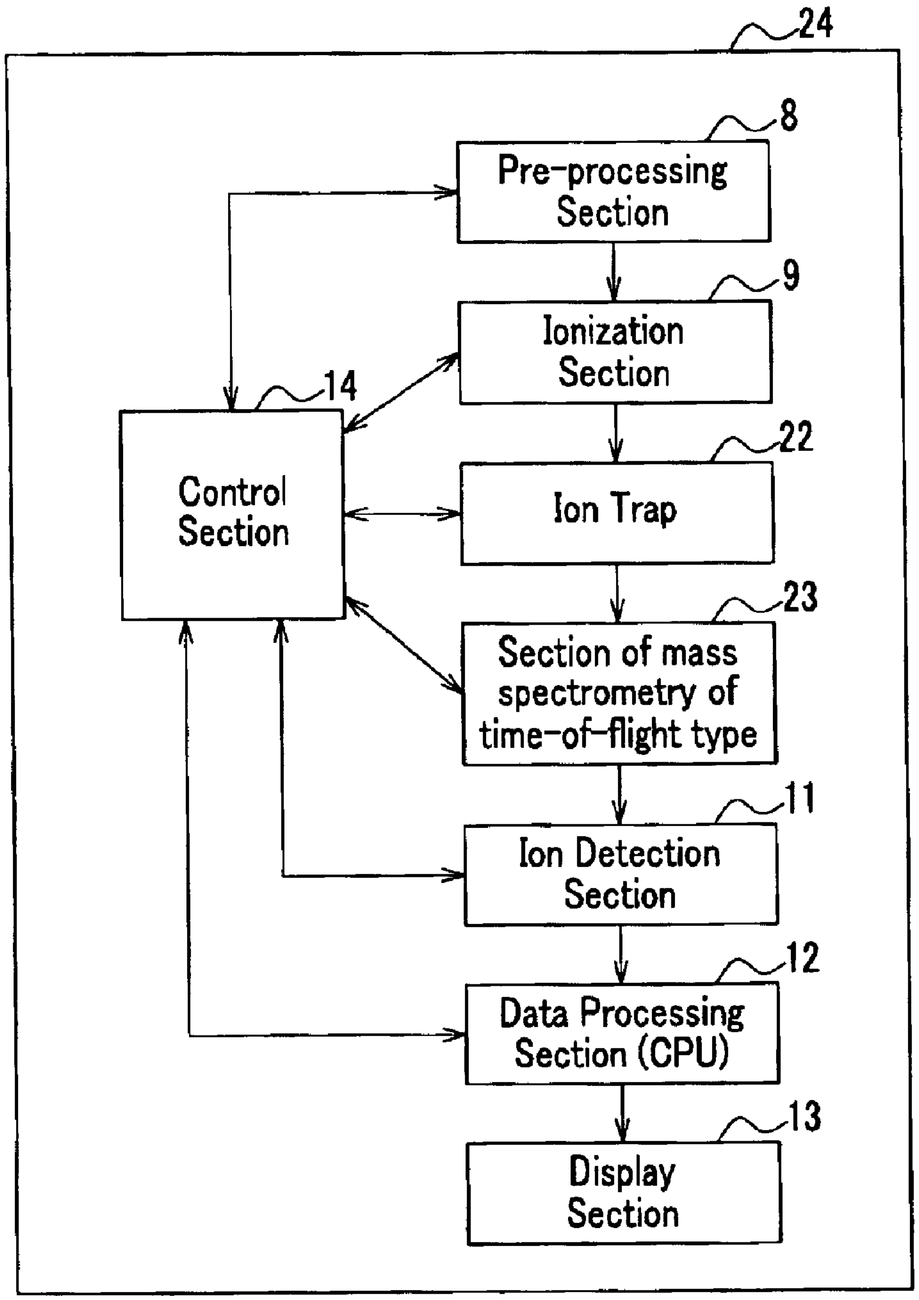
FIG. 15 is a diagram showing a general view of an apparatus for analyzing mass spectrometric data according to an eighth embodiment.
Figure 16:
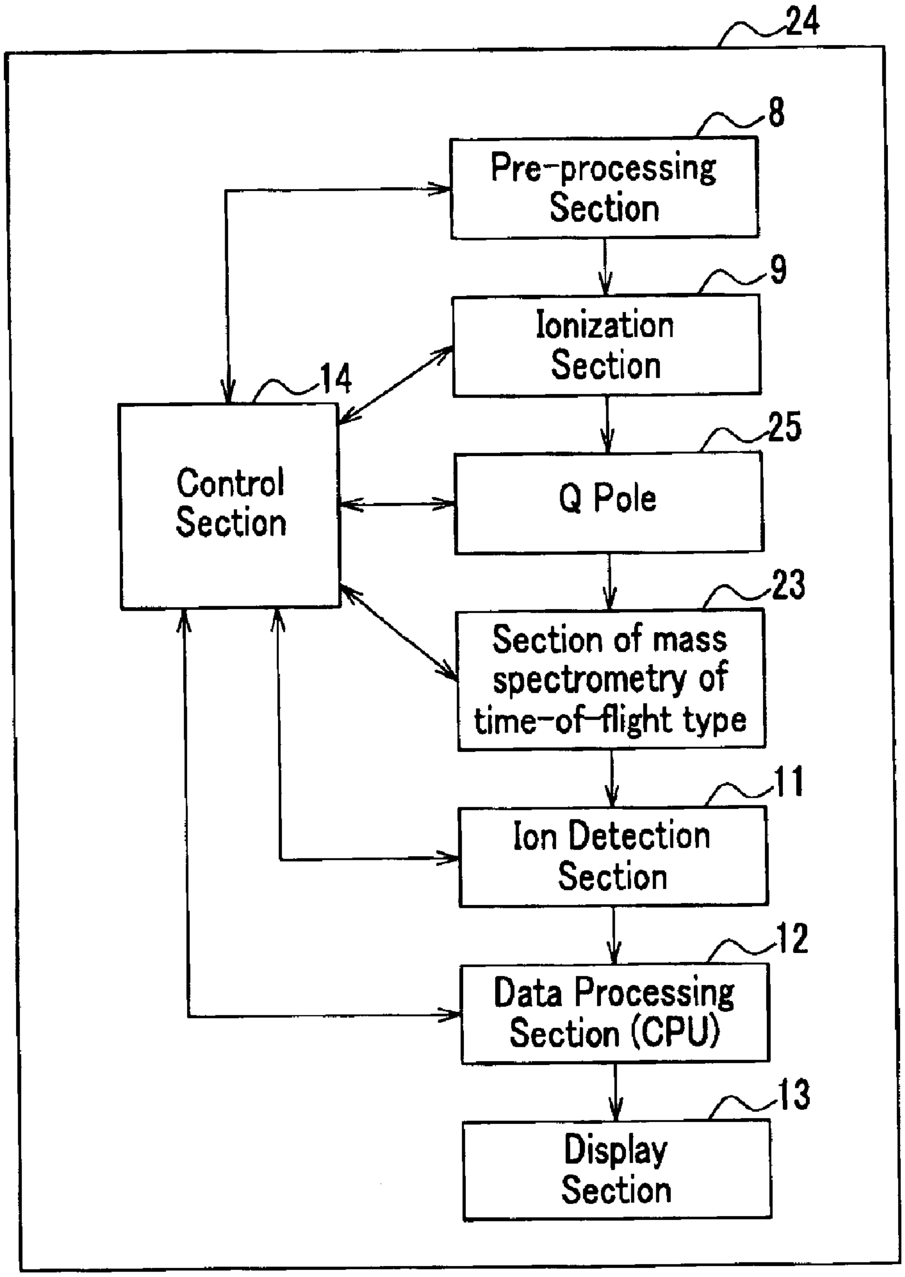
FIG. 16 is a diagram showing a general view of another apparatus for analyzing mass spectrometric data according to an eighth embodiment.

An eighth embodiment of the present invention is described referring to FIG. 15. The embodiment has a feature that an ion trap 22 is adopted for a collision cell and a section 23 of mass spectrometry of time-of-flight type (also referred to as TOF) is adopted for a section of mass spectrometry. Or as an alternative, a Q pole 25 made of four-rod electrode can be adopted for a collision cell. An ion trap has a disadvantage that the upper limit for measurement of mass-to-charge ratio m/z of a high polymer does not have flexibility. When an analysis is conducted for a biopolymer, the section 23 with TOF spectrometry, which is more suitable for analysis of high polymers, achieves better accuracy. Therefore, a method for analyzing mass spectrometric data of the present invention can be applied to an apparatus for mass spectrometry, which is prepared for the analysis of protein, peptide, sugar chain and the like.

Figure 17:
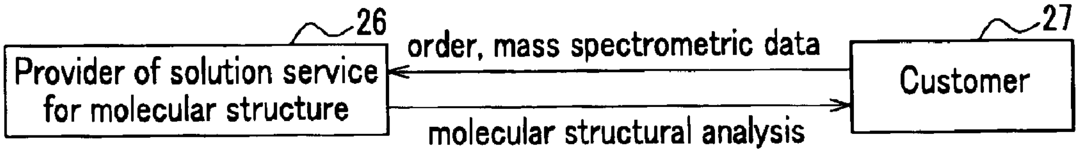
FIG. 17 is a diagram illustrating conceptually an example of solution business according to a ninth embodiment.

A ninth embodiment of the present invention is described referring to FIG. 17. The embodiment provides a method to execute business, which supplies a service associated with solution for structural analysis of a parent ion. As shown in FIG. 17, a business unit 26 receives an order for the structural analysis of a material. The business unit 26 then provides a customer 27 with the structure of parent ion, which is derived by using the method for analyzing mass spectrometric data of the present invention based on molecular orbital analysis. The approach for applying the method is separated into two cases. If a set of mass spectrometric data 1 for parent ion and dissociated ion is supplied by the customer 27, the business unit 26 provides the customer 27 with the structure of parent ion derived as a result of executing an analysis for the set of data with the method of the invention. Otherwise, the business unit 26 obtains a set of mass spectrometric data 1 from an available organization instead which can provide the data, and the business unit 26 provides the customer with the structure of parent ion in the same manner as that of the above case. The method of the invention, which makes it feasible to obtain results of structural analysis of a parent ion conducted by an expert on molecular orbital analysis and molecular dynamic calculation, can achieve the results with higher accuracy and reliability.

Figure 18:
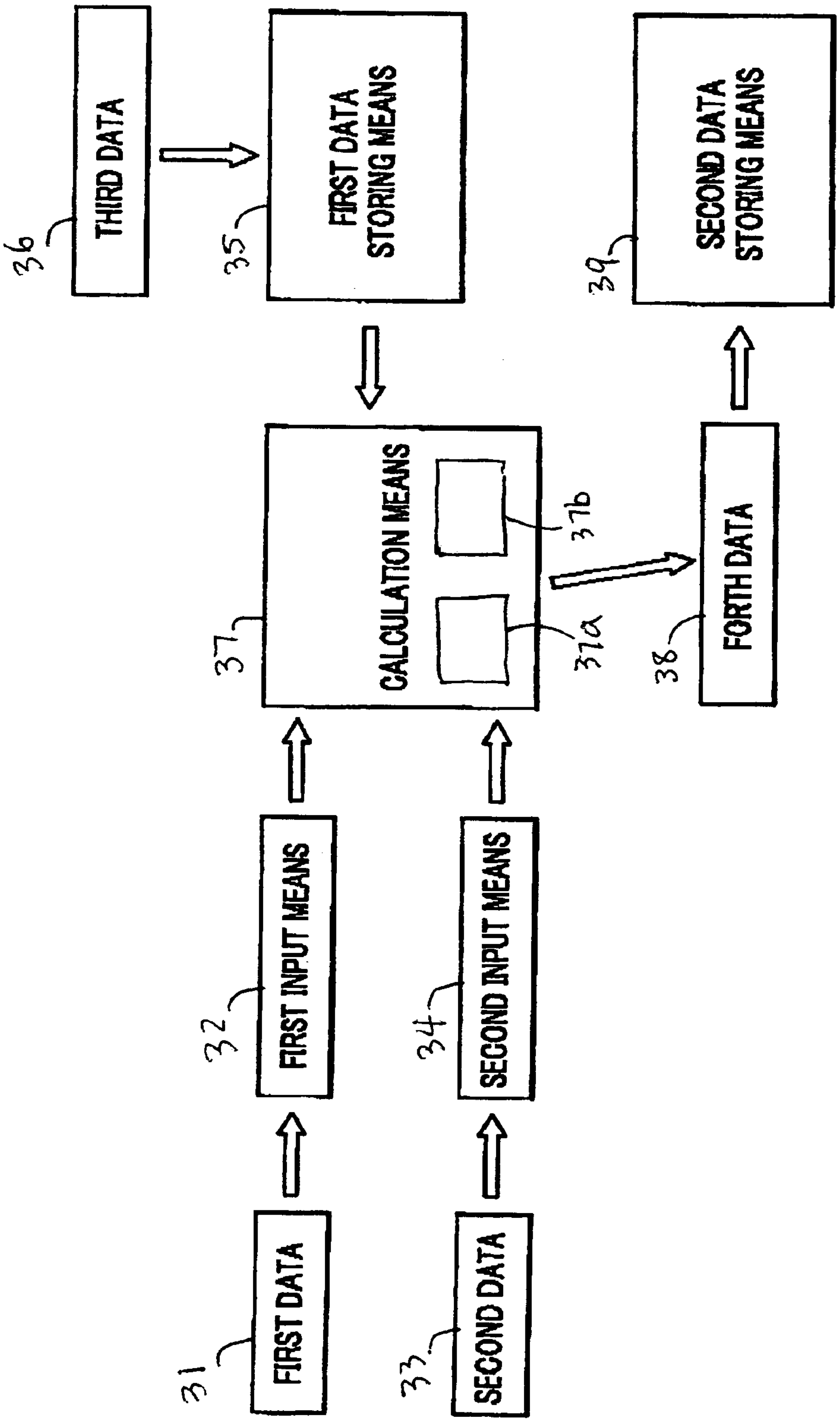
FIG. 18 illustrates an apparatus for analyzing mass spectrometric data according to embodiments of present invention.

FIG. 18 illustrates an apparatus for analyzing mass spectrometric data according to embodiments of the present invention. The apparatus includes a first input means 32 for entering first data 31, a second input means 34 for entering second data 33, a first data storing means 35 for storing third data 36, and an evaluation (or calculation) means 37 for evaluating the candidates. The fourth data 38 outputted by the calculation means 37 is stored in a second data storing means 39. The first data 31 may be data measured by mass spectrometry for an ion to be analyzed. The second data 33 may be data measured by mass spectrometry for first to Nth dissociated ions of the ion. The third data 36 may be data of mass spectrometry for a plurality of candidates for the structure of ion. The evaluation means may include a first selection means 37$a$ for selecting a first candidate for the structure of ion by making a comparison between the first data 31 and the third data 36 stored in the data storing means 35, and a second selection means 37$b$ which provides a calculation value of mass spectrometry for a Mth candidate, where M is less than or equal to N, and makes a comparison between a measured value of mass spectrometry for a Mth dissociated ion entered through the second input means 34 and the calculation value, repeating from M equal to 1 to M equal to L, where L is equal to or greater than 2 and less than or equal to N, so that a (M+1)th candidate for the structure of ion can be selected.

In addition to an apparatus for analyzing mass spectrometric data, a method for analyzing mass spectrometric data and a system for analyzing compound structure, which have been described above, a computer program installed in a computer to execute the steps of method can contribute to speeding up the structural analysis of a parent ion.

What is claimed is:

1. An apparatus for analyzing mass spectrometric data comprising:

a first input means for entering first data of an ion to be analyzed measured by mass spectrometry;

a second input means for entering second data of a dissociated ion of the ion measured by mass spectrometry;

a first data storing means for storing third data of mass spectrometry of a plurality of candidates for the structure of ion;

a calculation means for producing fourth data of mass spectrometry of dissociated ions to be used in analyzing the plurality of candidates; and an evaluation means for evaluating the plurality of candidates by making comparisons between the first and third data and between the second and fourth data, so that the structure of ion can be identified.

2. An apparatus according to claim 1, wherein the first, second, third and fourth data include mass-to-charge ratios and ion intensities, respectively.

3. An apparatus according to claim 1, wherein the calculation means executes a molecular orbital calculation for each candidate so that the fourth data can be obtained by calculation.

4. An apparatus according to claim 1, wherein the evaluation means comprises a selection means for selecting a candidate for the structure of ion by comparing the first and third data, the calculation means is able to calculate mass spectrometric data for a dissociated ion of the candidate selected by the selection means and the evaluation means evaluates the candidate by comparing the first data and the mass spectrometric data calculated for the candidate by the calculation means.

5. An apparatus according to claim 1, wherein the candidates evaluated by the evaluation means are displayed with ranking.

6. An apparatus according to claim 1, wherein the calculation means calculates three-dimensional structure for each candidate.

7. An apparatus according to claim 6, wherein the calculation means provides the three-dimensional structure by molecular dynamic calculation.

8. An apparatus according to claim 6, wherein the apparatus further comprises a displaying means for displaying the three dimensional structure.

9. An apparatus according to claim 1, wherein the apparatus further comprises a second data storing means for storing the fourth data.

10. An apparatus according to claim 1, wherein the first data enters the first input means, the second data enters the second input means and the fourth data is calculated by the calculation means, and wherein the apparatus estimates the structure of ion by making comparisons between the first data and the third data stored in a database, and between the second and fourth data.

11. An apparatus according to claim 10, wherein the apparatus is able to execute analysis for protein and peptide having amino acid as well as protein, peptide and sugar chain having modified amino acid.

12. An apparatus according to claim 1, wherein the apparatus is able to distinguish leucine from isoleucine which have amino acids of the same mass.

13. An apparatus according to claim 1, wherein the apparatus further comprises one of an ion trap unit, a triple quad time-of-flight instrument and a tandem mass spectrometry instrument.

14. An apparatus for analyzing mass spectrometric data comprising:

a first input means for entering first data measured by mass spectrometry for an ion to be analyzed;

a second input means for entering second data measured by mass spectrometry for first to Nth dissociated ions of the ion;

a data storing means for storing third data of mass spectrometry for a plurality of candidates for the structure of ion; and an evaluation means for evaluating the candidates, wherein the evaluation means comprises:

a first selection means for selecting a first candidate for the structure of ion by making a comparison between the first data and the third data stored in the data storing means; and a second selection means which provides a calculation value of mass spectrometry for a Mth candidate, where M is less than or equal to N, and makes a comparison between a measured value of mass spectrometry for a Mth dissociated ion entered through the second input means and the calculation value, repeating from M equal to 1 to M equal to L, where L is equal to or greater than 2 and less than or equal to N, so that a (M+1)th candidate for the structure of ion can be selected.

15. An apparatus for analyzing mass spectrometric data comprising:

an input means for entering one of first data measured by mass spectrometry for an ion to be analyzed and second data measured by mass spectrometry for a dissociated ion of the ion;

first public data of mass spectrometry for candidates for the structure of ion accessible by internet; and second public data of mass spectrometry for the structure of dissociated ion for each candidate accessible by internet, wherein the apparatus evaluates the candidates by making one of comparisons between the first data and first public data and between the second data and second public data, so that the structure of ion can be identified.

16. A method for analyzing mass spectrometric data, the method comprising the steps of:

measuring first data of mass spectrometry for an ion to be analyzed;

measuring second data of mass spectrometry for a dissociated ion of the ion;

storing third data of mass spectrometry for a plurality of candidates for the structure of ion;

calculating fourth data of mass spectrometry for dissociated ions to be used in analyzing the plurality of candidates for the structure of ion; and estimating the structure of ion by making comparisons between the first and third data, and between the second and fourth data.

17. A method according to claim 16, wherein the method is able to distinguish leucine from isoleucine which have amino acids of the same mass.

18. A system for analyzing compound structure comprising:

a means for conducting mass spectrometry for an ion to be analyzed and a dissociated ion of the ion; and an apparatus for analyzing mass spectrometric data, wherein the apparatus comprises:

a first input means for entering first data measured by mass spectrometry for an ion to be analyzed;

a second input means for entering second data measured by mass spectrometry for a dissociated ion of the ion;

a data storing means for storing third data of mass spectrometry for a plurality of candidates for the structure of ion;

a calculation means for producing fourth data of mass spectrometry for dissociated ions to be used in analyzing the plurality of candidates for the structure of ion; and an evaluation means for evaluating the candidates by making comparisons between the first and third data, and between the second and fourth data, so that the structure of ion can be identified.

19. A system according to claim 18, wherein the system is able to distinguish leucine from isoleucine which have amino acids of the same mass.

20. A computer program for a computer used for a system for analyzing compound structure, wherein the computer program executes the steps of:

measuring first data of mass spectrometry for an ion to be analyzed;

measuring second data of mass spectrometry for a dissociated ion of the ion;

storing third data of mass spectrometry for a plurality of candidates for the structure of ion;

calculating fourth data of mass spectrometry for dissociated ions to be used in analyzing the plurality of candidates; and estimating the structure of the ion by making comparisons between the first and third data, and between the second and fourth data.

* * * * *